(Model.)

W. T. ROGERS, dec'd,
C. W. ROGERS, administratrix.
HAND CORN PLANTER.

No. 246,209. Patented Aug. 23, 1881.

Witnesses:
Fred G. Dieterich
J. R. Littell

Catharine W. Rogers
Administratrix of the Estate
of Wm. T. Rogers, deceased,
Inventor by C. A. Snow & Co.
Attorneys

UNITED STATES PATENT OFFICE.

CATHARINE W. ROGERS, OF QUINCY, ILLINOIS, ADMINISTRATRIX OF WILLIAM T. ROGERS, DECEASED.

HAND CORN-PLANTER.

SPECIFICATION forming part of Letters Patent No. 246,209, dated August 23, 1881.

Application filed November 27, 1880. (Model.)

*To all whom it may concern:*

Be it known that WILLIAM T. ROGERS, deceased, of Quincy, in the county of Adams and State of Illinois, did invent certain new and useful Improvements in Hand Corn-Planters; and I do hereby declare that the following is a full, clear, and exact description of the invention, which will enable others skilled in the art to which it appertains to make and use the same, reference being had to the accompanying drawings, which form a part of this specification.

Figure 1:
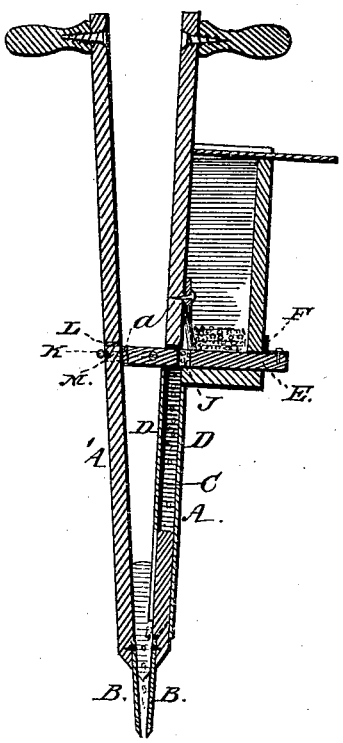
Figure 2:
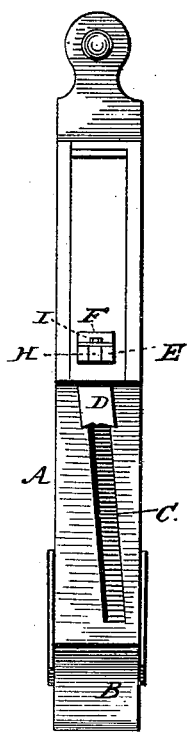
Figure 4:
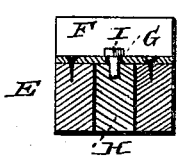
Figure 3:
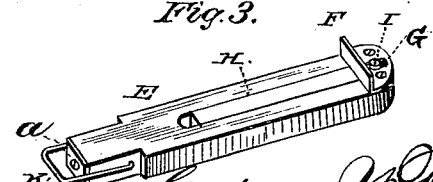

Figure 1 is a vertical sectional view of a corn-planter embodying the improvements. Fig. 2 is a side elevation, with the face-plate of the bevel chute removed. Fig. 3 is a perspective view of the slide and hinge connection, and Fig. 4 is a transverse sectional view of the slide.

This invention relates to hand corn-planters; and it consists of the improved features of construction and combination hereinafter fully described, and particularly pointed out in the claim.

Referring by letter to the accompanying drawings, A and A' designate the legs of the corn-planter, pivoted together near their lower ends and provided with the usual blades, B B. The leg A carries the seed-hopper, and is provided with an elongated diagonal slot, C, starting from the middle of the bottom of the hopper and running to nearly the outer lower corner of said leg A. This slot C is sawed out, and a chute is formed by facing both sides of the leg A, along the slot, with metal plates D D, leaving ingress and egress openings for the corn at the top and bottom of the chute. The object in making the chute diagonal is to dispense with the scatterer ordinarily employed. The corn passes through the chute to the upper edge of the blade, the edge of the planter nearest the lower termination of the diagonal chute being termed the "upper" edge, and consequently is scattered when it falls along the entire width of the blades after they are sunk in the ground.

The slide E is formed of wood, except the flexible washer *a* and the malleable stop F, which latter is fastened to the end of the slide that projects from the hopper, and is provided with a slot, G, which runs parallel with the slide. The slide has a sliding tongue, H, which is secured to the malleable stop F by a set-screw, I, by means of which the sliding tongue may be adjusted from the outside of the hopper to regulate the size of the discharge-orifice J. The other end of the slide E is provided with a double hinge, K, formed of wire bent into rectangular form, and having its ends entered into the slide E. The loop thus formed is passed through a U-shaped aperture, L, in the leg A', and then down over a stud or tongue, M, formed by said aperture, to complete the connection between the slide and leg A'.

By this construction of hand-planters better work can be done, and the device is of simpler construction and far cheaper to manufacture than corn-planters of its class now in use.

It is well known that the pivoted legs, the feed-slide, the elastic stop, and the feed-tube are old in hand corn-planters, and the claim is limited to the particular combination hereinafter specified.

Having thus described the invention, what is claimed as new is—

As an improvement in hand corn-planters, the combination, with the hinged legs, one of which is provided with a hopper and chute, and the other with a U-shaped slot or opening, of the feed-slide hinged upon the tongue of said U-shaped slot by a U-shaped bail, K, a washer being interposed, as herein described, for the purpose set forth.

In testimony that I claim the foregoing as the invention of the said W. T. ROGERS I have hereto affixed my signature in presence of two witnesses.

CATHARINE W. ROGERS,
*Administratrix of the estate of W. T. Rogers, deceased.*

Witnesses:
G. M. McMURRY,
HERBERT LIVINGSTON.